United States Patent Office 3,529,464
Patented Sept. 22, 1970

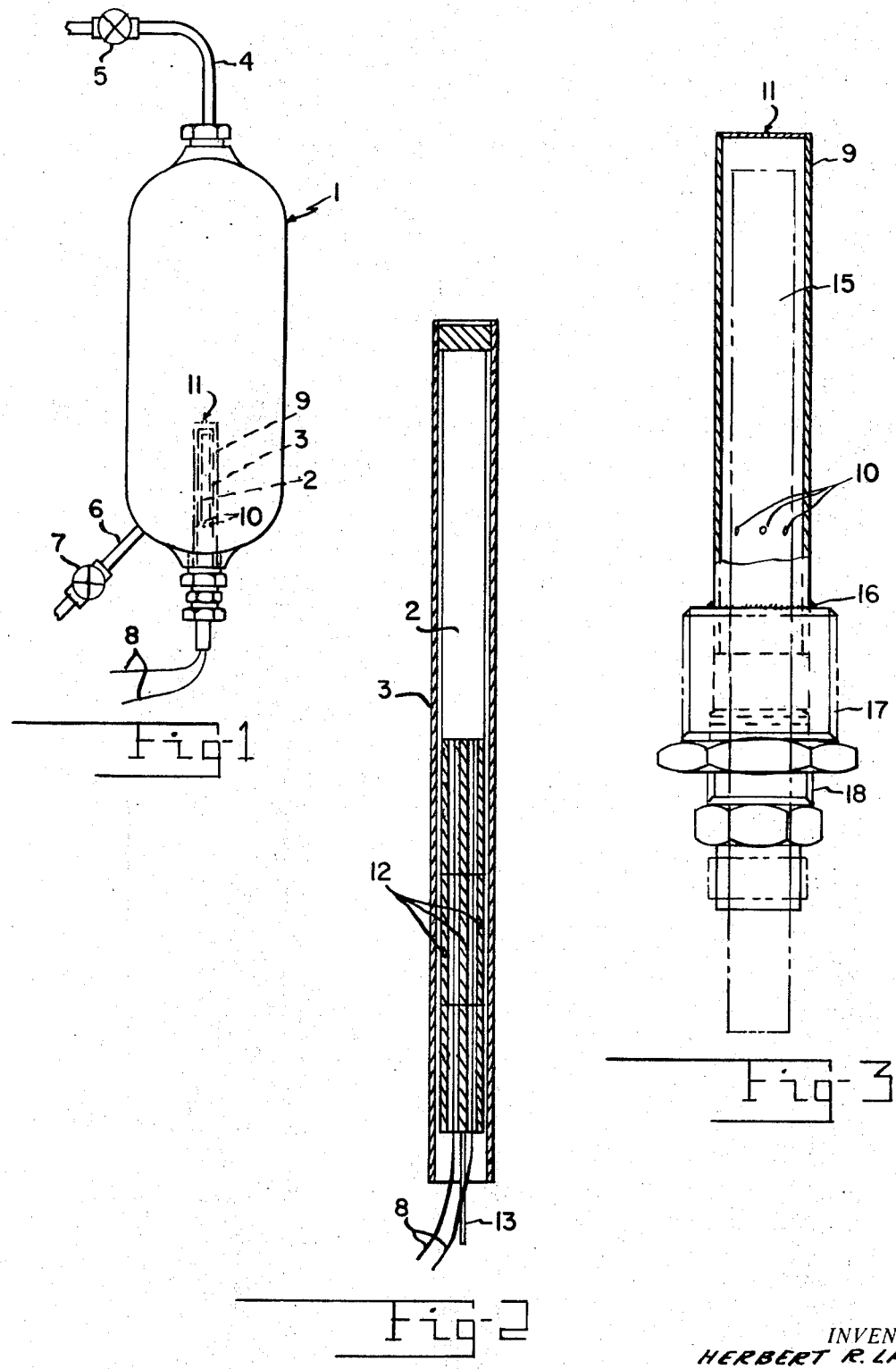

3,529,464
APPARATUS AND METHOD FOR MEASURING
JET FUEL THERMAL STABILITY
Herbert R. Lander, Jr., and Lawrence A. Wogoman, Dayton, Ohio, assignors to the United States of America as represented by the United States Air Force
Filed Feb. 12, 1969, Ser. No. 798,639
Int. Cl. G01n 33/22
U.S. Cl. 73—61.2                     2 Claims

ABSTRACT OF THE DISCLOSURE

An apparatus and a method for evaluating the ability of jet fuel to withstand high temperatures. The invention comprises placing an amount of jet fuel to be tested in a high pressure cylinder, pressurizing the fuel with an inert gas to prevent it from boiling when heated, heating the fuel to test temperatures for about one hour with a heating element sheathed in a metal sheath, cooling the system, and analyzing the deposits deposited on the metal sheath.

BACKGROUND OF THE INVENTION

Field of the invention

This invention relates to testing, particularly the testing of jet fuel for thermal stability.

Description of the prior art

As the speed of air-breathing aircraft increases to multi-Mach regimes certain properties of the fuel become extremely important to the proper operation of the aircraft. One property of great importance is the thermal stability of the fuel. Thermal stability is the ability of the fuel to withstand thermal stresses to which it is exposed. The thermal stresses which are applied to the fuel result from high surface metal temperatures of the airframe and engine components and the fact that the fuel is used for cooling the airframe and engine components of certain supersonic aircraft.

The thermal stability of fuel is thought to be related to chemical reactions which occur at various temperatures depending upon the type of fuel, crude source, amount of contamination present, and so forth. Theory blames thermal stability deterioration on various oxidation, polymerization, and condensation reactions which take place at high temperatures and form insoluble resinous compounds which adhere to metal surfaces. Thermal stability cannot be determined or predicted by chemical analysis because of the complexity of jet fuels. Therefore, performance tests have been developed which rate the ability of fuels to withstand high temperatures without concern for the complicated chemistry involved. The tests involve heating of the jet fuel to temperatures at which the oxidation, polymerization, and condensation reactions take place and then rating the deposits formed by a standardized color code.

Test devices used in the prior art have evolved from attempts to simulate or imitate the actual fuel flow conditions of an aircraft. The original workers felt that it was necessary to carry out thermal stability tests with a dynamic device in which the fuel was heated by flowing it annularly along a heating element in a manner similar to that when it flows past airframe and engine components of an aircraft. The development of dynamic devices resulted in heavy, bulky apparatus requiring large amounts of fuel and excessive amounts of time for thermal stability tests.

Typical thermal stability testing devices of the prior art require upwards of five gallons and upwards of five hours testing time for thermal stability tests. The devices generally have a fuel reservoir, a pump for pumping fuel out of the reservoir and pushing it annularly through a column past a heating element, a filter to filter out any insoluble material formed in the fuel by heating, means to measure the pressure drop across the filter, and a cooler to cool the fuel after testing is completed to reduce fire hazards.

There are several drawbacks to the devices described above. As stated above, they are bulky and heavy. Therefore, they require a large amount of space in a laboratory and are hard to move from location to location. Testing time generally requires upwards of five hours. Assuming approximately an hour to get a test started and an hour to clean up after a test, it can readily be seen that almost one man day of labor is required for one test. If duplicate results are desired, approximately two man days of labor are necessary. Large amounts of fuel are needed for a test. Large amounts of fuel can only be moved and handled by strong men or machinery. The operation of the prior art devices is complicated. Thus, skilled technicians are required to perform the test. The pumps must be constantly replaced because worn pumps cause deposits which are not from the fuel itself.

It was originally thought that the pressure drop measurement was the most important. However, use of the prior art devices has shown that most of the insoluble materials formed during fuel heating plate out on the metal of the heater. Because of this discovery, attention to the pressure drop has been generally discarded for standardized color tests of the deposits formed on the metal of the heating element.

SUMMARY OF THE INVENTION

It has now been found that reliable jet fuel thermal stability tests can be carried out in approximately one hour with approximately one quart of fuel. The apparatus of this invention may be used by anyone capable of handling very light weights and learning a few simple techniques. The apparatus is static and comprises essentially a small bomb, means for pressurizing the bomb with an inert gas, a heating apparatus with means for keeping fuel flowing along it, and means for monitoring the temperature of a metal sheath around the heating element. The method of using this invention comprises essentially placing about one quart of fuel in the bomb, pressurizing the bomb with an inert gas, applying heat to the contents of the bomb with the heating element, draining the bomb, and analyzing the deposits deposited on the metal sheath around the heating element.

BRIEF DESCRIPTION OF THE DRAWING

FIG. 1 is a cross section of the bomb showing the heating element inserted;

FIG. 2 is a detailed cross section of the heating element; and

FIG. 3 is a detailed cross section of the heating element and the chimney surrounding it which, when the apparatus is in operation, keeps fuel flowing along the heating element.

DESCRIPTION OF THE PREFERRED EMBODIMENT

FIG. 1 of the drawing shows a cutaway view of the bomb 1 of this invention with the heating element 2 inserted. Around the heating element 2 there is a metal sheath 3 upon which the insoluble materials created by heating of the fuel are deposited. Line 4 and valve 5 are to allow pressurization of the bomb with an inert gas such as helium from a source not shown. Line 6 and valve 7 are to allow the release of the fuel and inert gas after completion of a thermal stability test run. Wires 8 are lead wires to a source of electricity (not shown) used to heat the heating element 2. Completely surrounding the heating element 2 and sheath 3 is a stainless steel chimney 9 with several small holes 10 drilled in it near the base of the bomb and one or more holes 11 drilled in its top.

FIG. 2 is a detailed view of the heating element 2 and its sheath 3. Leads 8 are shown running up between insulators 12 and connecting to the heating element 2. A thermocouple 13 is placed between the heating element 2 and sheath 3 and connected to the metal of the sheath 3 to monitor the temperature of the metal during test runs. The sheath 3 is fabricated from aluminum.

FIG. 3 shows how the stainless steel chimney 9 is used to concentrically surround the components of the heating element (shown together as a dashed line and denoted by 15). The stainless steel chimney has several small orifices 10 drilled about 3 inches from its upper end and another orifice or orifices 11 drilled directly in its upper most end. When the heating element is in operation, fuel flows in through orifices 10, upward along the heated sheath, and out through orifice or orifices 11. Thus, actual flow conditions of an aircraft are simulated without requiring a large, dynamic device.

The lower portion of FIG. 3 shows a weld 16 holding the stainless steel chimney 9 to a stainless steel bushing reducer 17. A stainless steel swaglok connector 18 is used to fasten the heating element into place. It should be understood that any method of closing the bottom of the bomb and holding the heating element in place which would enable the apparatus to withstand the pressures necessary for the test would be acceptable. The uniqueness of the apparatus of this invention lies in the structure of the stainless steel chimney 9 surrounding the heating element and in the way it forces fuel to flow along and past the heating element sheath 3 when power is applied to the heating element 2 through leads 8. The orifices 10 permit fuel to enter a small open area between the chimney 9 and the sheath 3 and the walls of the chimney 9 force the fuel to remain in close contact with the sheath 3 until it flows out through orifice or orifices 11. The size of the orifice 11 should be smaller than the size of orifices 10 since the top orifice controls the rate at which fuel passes along the heated sheath 3.

Another unique aspect of this invention is in the method of using it and its simplicity. To conduct a jet fuel thermal stability test, the operator simply places about 1000 ml. of fuel in the bomb, tightens all connections, pressurizes the bomb to about 250 p.s.i. by opening the valve 5 and closing it when the required pressure shows on a guage (not shown), turns on the heating element, lets it heat until the thermocouple 13 tells him that a predetermined temperature has been reached, shuts off the heating element, drains the bomb, removes the heating element and its sheath 3 and analyzes the deposits on the sheath 3 according to a well-known color code. The equipment may be operated without a thermocouple 13 simply by supplying a predetermined amount of electrical power for a predetermined amount of time. A 500 watt electrical heating element operated for about one hour is sufficient for most jet fuels.

The bomb of the apparatus is constructed from stainless steel and should be built to withstand the critical temperature and pressure of any jet fuel contemplated for testing. The metal sheath of the heating element is constructed from aluminum and must, of course, be thoroughly cleaned before each thermal stability test. If desired, the temperature of the walls of the bomb may also be monitored with a thermocouple. In order to minimize fire hazards the fuel may be cooled by passing it through a standard heat exchanger after completion of a test run.

The apparatus and method of this invention offer the following advantages. The apparatus is static and requires only about 1000 ml. of fuel for a test run. Test time is only about one hour. The test device is small and simple to operate. The apparatus is not expensive. Operating and maintenance costs are not prohibitive. Pumps, flow controls, and flowmeters are not necessary.

Various bombs ranging in size from about 2000 ml. capacity to about 5000 ml. capacity have been tested in this laboratory. Bomb capacity does not appear to be critical.

The color code by which the deposits on the aluminum sheath of the heating element is rated is well known in the art.

Various chimneys 9 have been experimented with especially with regard to the relative sizes of orifices 11 in relationship to orifices 10 and with regard to the distance of the inner wall of the chimney from the outer wall of the sheath 3. The inner wall of the chimney should probably be on the order of from 0.04 inch to 0.25 inch from the outer wall of the sheath. The upper or exit orifice 11 should probably have a diameter in the range of 0.25 to 0.75 of the diameter of the lower or entrance orifices 10. Exact optimum sizes are still subject to experimentation.

What is claimed is:

1. Apparatus for statically testing the thermal stability of jet fuel, said apparatus comprising:
   (a) a bomb;
   (b) means for pressurizing said bomb with an inert gas;
   (c) a heating element sheathed in an aluminum sheath and mounted within said bomb;
   (d) a chimney having a base and a top, said chimney being mounted within said bomb so as to concentrically surround said sheathed heating element;
   (e) a plurality of fuel entrance orifices formed in said chimney near its base; and
   (f) at least one fuel entrance orifice formed in the top of said chimney, said orifices being adapted to direct the flow of fuel in through the entrance orifices, upwardly between said chimney and said aluminum sheath, and out through the exit orifice when the fuel is heated by the heating element.

2. A method for treating the thermal stability of jet fuel, said method comprising the steps of:
   (a) placing jet fuel in a bomb, said bomb having inserted within it a heating element sheathed in an aluminum sheath and a chimney concentrically surrounding the sheath, said chimney having inlet orifices near its base and at least one outlet orifice in its top;
   (b) pressurizing said bomb with an inert gas;
   (c) heating said jet fuel with said heating element to a predetermined temperature, thereby causing the fuel to flow into said chimney through said inlet orifices, and upwardly between said chimney and said aluminum sheath, and out of said chimney through said outlet orifice;
   (d) draining fuel from said bomb;
   (e) removing said heating element and said chimney; and
   (f) rating any deposit on said aluminum sheath of said heating element according to a predetermined color code.

References Cited

UNITED STATES PATENTS 3,148,534   9/1964   Benson _____ 73—61.2

LOUIS R. PRINCE, Primary Examiner

J. W. ROSKOS, Assistant Examiner